Figure 1:
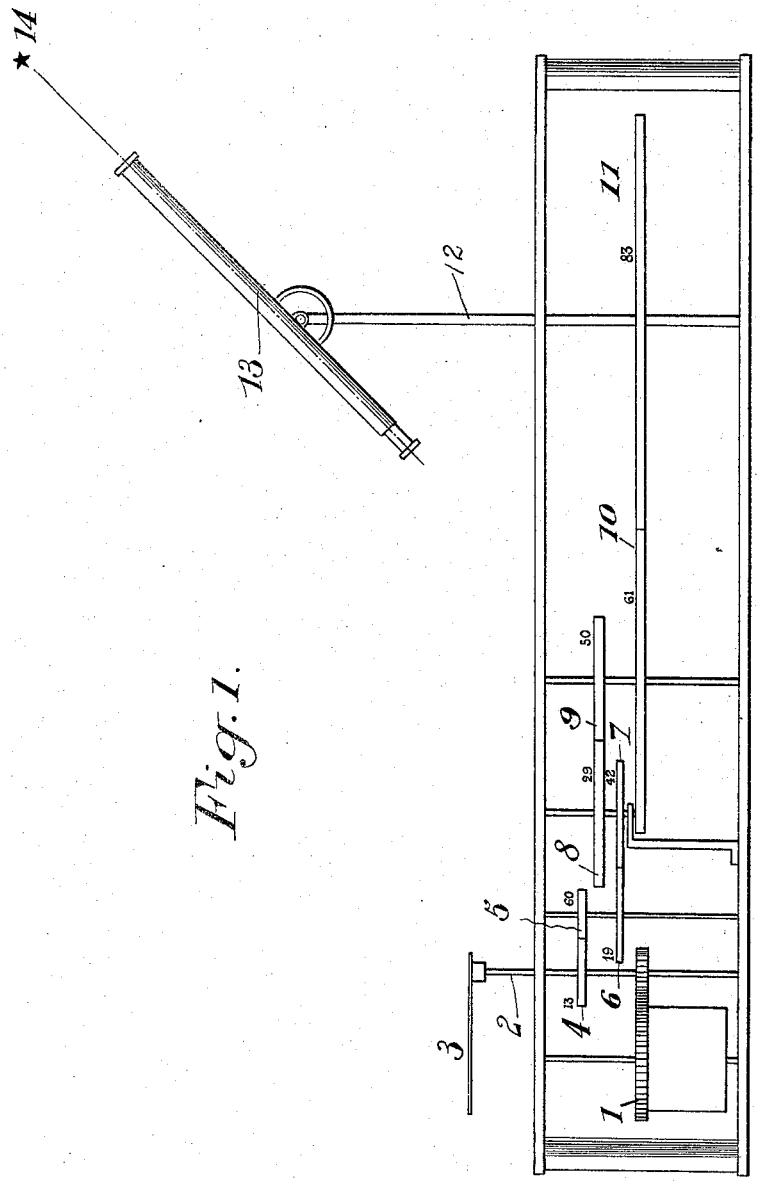

J. E. J. VANDERVENNET.
APPARATUS FOR CONVERTING SIDEREAL TIME TO MEAN SOLAR TIME AND VICE VERSA.
APPLICATION FILED JULY 23, 1914.

1,201,895.

Patented Oct. 17, 1916.
2 SHEETS—SHEET 1.

Witnesses:
F. M. Meyer
E. E. Johansen

Inventor:
Jean Edouard Joseph Vandervennet
By _____ Attorney

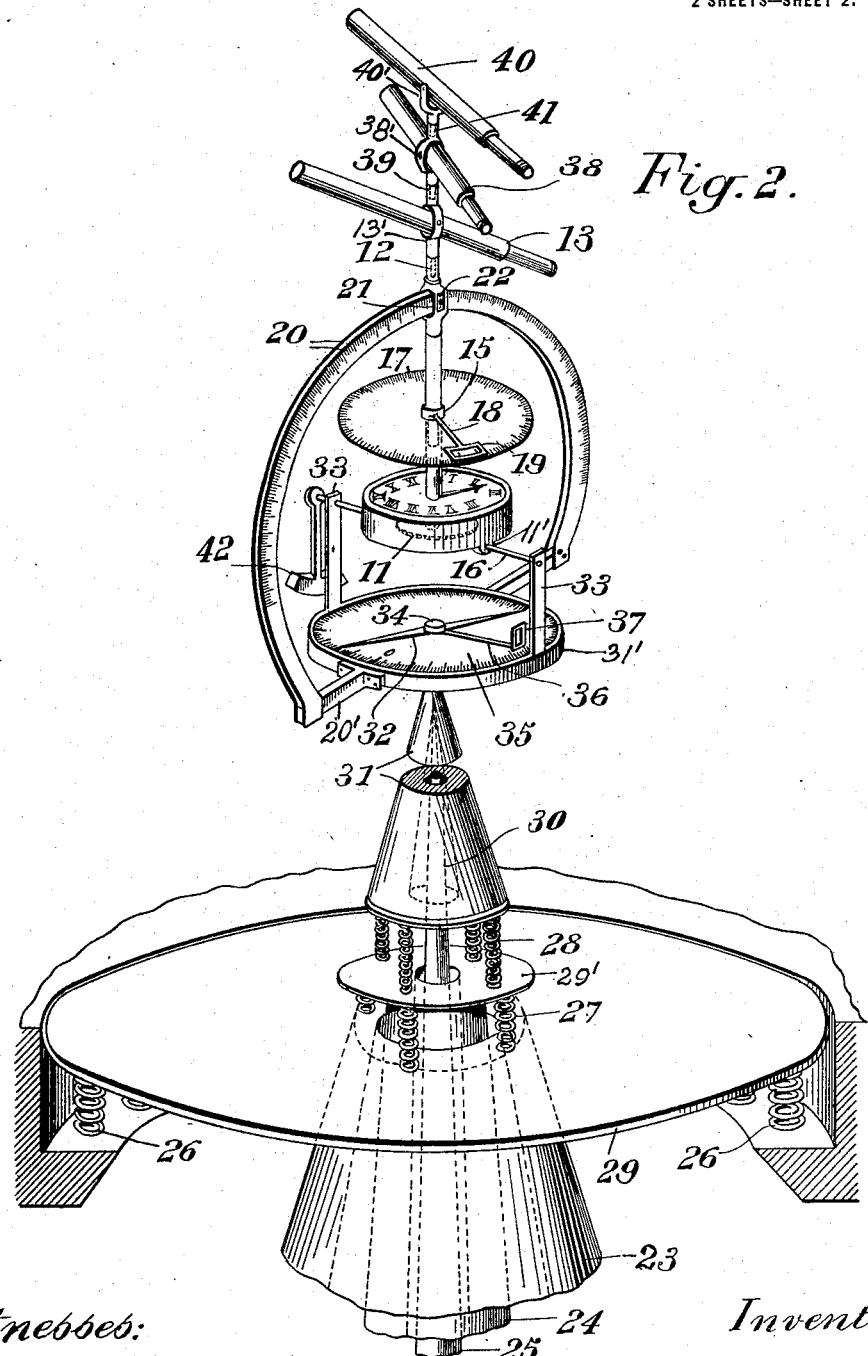

UNITED STATES PATENT OFFICE.

JEAN EDOUARD JOSEPH VANDERVENNET, OF GHENT, BELGIUM.

APPARATUS FOR CONVERTING SIDEREAL TIME TO MEAN SOLAR TIME AND VICE VERSA.

1,201,895.     Specification of Letters Patent.     Patented Oct. 17, 1916.

Application filed July 23, 1914. Serial No. 852,703.

*To all whom it may concern:*

Be it known that I, JEAN EDOUARD JOSEPH VANDERVENNET, a subject of the King of Belgium, and resident of Ghent, Belgium, have invented certain new and useful Improvements in Apparatus for Converting Sidereal Time to Mean Solar Time and Vice Versa, of which the following is a specification.

The relation between the mean time and the true sidereal time is well known. As a matter of fact it has been determined by astronomy that after each sidereal year comprising 365 days, 6 hours, 9 minutes, 9 seconds or 365.25636 days the sun comes back to the same fixed star or to the same meridian as the latter. From this recognized fact it follows that within this lapse of time the fixed stars turn around the earth once more than the sun and the relation between the solar time and the sidereal time is as follows:

$$\frac{366.25636}{365.25636}$$

If a dial were placed at the equator at right angles to the axis of the earth and provided with two hands one of which has the movement of the means sun and the other the movement of a fixed star, and if moreover the moment is chosen at which the mean sun registers with the fixed star, the two hands pointed toward said bodies would register with each other at that moment, but the hand which follows the fixed star would soon be moved forwardly to register again with the hand which follows the means sun after a sidereal year. Therefore one of said hands would have been turned 365.25636 times around the dial while the other hand would have been turned 366.25636 times around same. Based upon this consideration and particularly upon the relation between the mean solar time and the true sidereal time, my present invention has for its primary object to provide an apparatus termed "sidereal - solar converter," by means of which the solar time may be determined without calculation if the sidereal time is known and reciprocally, and which combined with an equatorial telescope forms either a combined converter and chronometer by means of which the true time may be kept indefinitely, the clock being directly regulated according to the movement of a fixed star, or a combined converter and compass, by means of which the declination of the magnetic needle as well as the longitude and latitude of the place to which the apparatus has been transported may be determined without calculation almost instantly with the maximum amount of precision.

Figure 1 of the accompanying drawings shows a diagrammatical view of the combined converter and chronometer. Fig. 2 shows a perspective view of the complete device (such as it is constructed and provided with a balancing device for use on ships).

I will first describe the sidereal solar converter without the combination of the equatorial telescope.

Referring to Fig. 1, the telescope 13 is considered as a hand turning around a dial every sidereal day. The apparatus, in which a regulated motor actuates simultaneously a solar clock and a sidereal clock is characterized by the fact that both clocks are made to depend on each other by means of a movement the ratio $$\frac{13 \times 19 \times 29 \times 61}{60 \times 21 \times 25 \times 83}$$

of which is approximately equal to the relation between the solar movement and the sidereal movement, so that if for instance the minute-hand 3 of the solar clock and the hand 13 of the sidereal clock, are held on their axes in positions corresponding exactly to the solar time and the sidereal time and if the clock goes too fast or too slow, it will be sufficient to know the mean solar time or the sidereal time and regulate the clock in order to determine at once either the corresponding sidereal time, or the solar time. For instance if it is desired to convert 20 m. 20 s. of solar time into sidereal time, it will be sufficient to push the solar clock forwardly to a corresponding extent and to show how much the sidereal clock has been advanced.

The apparatus comprises a solar clock 1, the shaft 2 of the minute-hand 3 carries a toothed wheel 4, forming the first wheel of a clock-work 5, 6, 7, 8, 9, 10 and 11, the last wheel 11 of which actuates a shaft 12 carrying a hand 13 made to make one revolution every sidereal day.

The clock-work 4—11 is constructed so as to correspond to the relation:

$$\frac{36625636}{36525636} \times 24$$

This relation decomposed into factors may be written approximately as follows:

$$\frac{13 \times 19 \times 29 \times 61}{60 \times 42 \times 50 \times 83}$$

according to which the wheel 4 provided with thirteen teeth meshes with the wheel 5 provided with sixty teeth. The wheel 6 mounted on the same shaft as 5, is provided with nineteen teeth and so on. The following wheels are provided respectively as follows: The wheel 7 has forty-two teeth, the wheel 8 has twenty-nine teeth, the wheel 9 has fifty teeth, the wheel 10 has sixty-one teeth and the wheel 11 has eighty-three teeth.

The apparatus combined with an equatorial telescope 13, that is an astronomical telescope carried by a rigid shaft placed in the direction of the axis of the earth and adapted to turn around itself so as to enable the telescope to follow the movement of a star, enables first to keep the true time indefinitely. In order to cause the telescope 13 to follow the movement of a star, said telescope must turn around itself every sidereal day, which result is obtained by arranging the telescope carrying shaft 12 upon the wheel 11 making one revolution every sidereal day.

In order to enable the shaft 12 to be placed in the direction of the axis of the earth, the wheel 11 which carries said shaft must be arranged in a plane at right angles to said direction and at the time mesh with the wheels of the clockwork. This may be obtained in various ways, either by arranging said wheel alone in such a plane, or by arranging the eight wheels of the clockwork in such planes, or again by arranging all the wheels both of the clock and the said clockwork in such planes. Moreover all the wheels both of the clock and the converter may be arranged in planes at right angles to the axis of the earth, if the complete apparatus is arranged on a horizontal shaft 16 (Fig. 2) at right angles to the shaft 12 of the telescope and therefore to the axis of the earth, the shaft 12 of the telescope being pointed to the celestial pole. In order to enable the apparatus combined with an equatorial telescope 13 as described to keep indefinitely the time once received, it is only necessary that the apparatus shows itself its loss or its gain and enables the same to be corrected. Now if the last wheel 11 of the converter does not make a revolution exactly every sidereal day, but a little faster or slower, the telescope will not remain in its adjusted position. There will be an indication that the clock goes too fast or too slow. If the star is brought back to the center of the field of the telescope by accelerating or retarding the movement of the clock, the effect will be the same as if the clock had always worked regularly and the loss or the gain will be corrected. The relation $$\frac{23 \times 47 \times 49 \times 107}{16 \times 20 \times 20 \times 37}$$

is of such a precision that the telescope being once adjusted, the clock will not lose a second even after several centuries.

The apparatus as constructed in accordance with Fig. 2 comprises a heavy bell 23, surrounding a conical member 24, which in turn surrounds a shaft 25, the bell 23 being suspended from a plate 29, suitably supported upon coil springs 26 and supporting coil springs 27, carrying a second plate 29', formed integral with the member 24 and in turn supporting coil springs 28, upon which is mounted a conical cap 31, carried by the upper portion 30 of the shaft 25, which in turn supports a compass 31' having the usual needle 32 pivoted upon a shaft 34, the compass casing 31' carrying uprights 33—33, connected by a pivoted cross bar 16, a movement of which is controlled by means of a weight 42. Rigidly mounted by means of ears 11' upon the shaft 16, is a clockwork mechanism 11, the shaft 12 of which extends upwardly and carries a disk 17, graduated into three hundred and sixty degrees, and provided with a sliding indicator 18, pivotally mounted upon the shaft 12 by means of a collar 15. The shaft 12 is further provided with an eye 21, provided with sight opening 22, through which is viewed a quadrant 20, adapted to pass through the eye 21, the quadrant being suitably supported by brackets 20' upon the compass casing 31'. Above the eye 21, the shaft 12 is provided with means 13' for pivotally mounting a telescope 13, means 38' for pivotally mounting a telescope 38, and means 40' for pivotally mounting a telescope 40, the telescopes being so mounted by means of swivel joints 39 and 41 as to provide for independent rotary movement of each of them.

Having now fully described my said invention, what I claim and desire to secure by Letters Patent is:

1. In a device of the character described, the combination with a resilient support, of a shaft supported thereon, a compass on said shaft and adapted to turn thereon, a quadrant mounted on said compass, a support on said compass, a clockwork mounted upon said support, a second shaft extending from said clockwork, a dial on said second shaft, a pointer on said shaft coöperating with said dial, an indicator on said second shaft adapted to coöperate with said quadrant, and means for supporting a plurality of telescopes carried by said second shaft.

2. In a device of the character described, the combination with a resilient support, of a compass mounted thereon, a plurality of uprights extending from said compass, a cross bar connecting said uprights, a clockwork pivotally mounted on said cross bar, a shaft extending from said clockwork and carrying a pointer, a dial arranged to coöperate with said pointer and mounted on said shaft, that portion of the shaft carrying the pointer being adapted to be driven by the clockwork mechanism, that portion of the shaft carrying the dial being stationary, indicating means carried by the said shaft adapted to coöperate with the quadrant, and means for supporting a plurality of telescopes upon said non-rotatable shaft.

3. In a device of the character set forth, the combination with means for determining the north pole, of means suitably connected therewith for indicating the sidereal time, means for ascertaining the solar time, and means coöperating with both of said time determining means adapted to operate to convert the sidereal time to solar time, and vice versa.

4. In a device of the character set forth, the combination with a support, of a shaft supported thereon, direction indicating means rotatably mounted on said shaft, degree indicating means adjacent thereto and adapted to coöperate with said direction indicating means, a second shaft, means for rotating said shaft, indicating means carried by said second shaft adapted to coöperate with said degree indicating means, and means carried by said second shaft adapted to support a plurality of point locating devices adapted to coöperate with both said degree indicating means and said direction indicating means.

5. In a device of the character described, the combination with a support, of a compass mounted thereon, means connected therewith for indicating the sidereal time, means coöperating with said sidereal time indicating means for ascertaining the solar time, and means comprising degree indicating means, point locating devices adapted to coöperate with said degree indicating means, and a time indicator adapted to coöperate with both of said time determining means to convert the sidereal time to solar time, and vice versa.

In testimony whereof I have hereunto set my hand in presence of two witnesses.

JEAN EDOUARD JOSEPH VANDERVENNET.

Witnesses:
  G. G. CATERMARY,
  CHAS. ROY NASMITH.